United States Patent
Ayala, Jr. et al.

(10) Patent No.: US 9,582,319 B2
(45) Date of Patent: Feb. 28, 2017

(54) MIGRATING VIRTUAL MACHINES ACROSS NETWORK SEPARATED DATA CENTERS

(75) Inventors: Richard J. Ayala, Jr., Medford, NJ (US); Eric K. Butler, San Jose, CA (US); Kavita Chavda, Roswell, GA (US); Mihail C. Constantinescu, San Jose, CA (US); Reshu Jain, Sunnyvale, CA (US); Prasenjit Sarkar, San Jose, CA (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 12/856,019

(22) Filed: Aug. 13, 2010

(65) Prior Publication Data
US 2012/0042033 A1    Feb. 16, 2012

(51) Int. Cl.
G06F 15/167    (2006.01)
G06F 9/48    (2006.01)

(52) U.S. Cl.
CPC .................................. *G06F 9/4856* (2013.01)

(58) Field of Classification Search
CPC ....................................................... G06F 9/4856
USPC ........................................................ 709/216
See application file for complete search history.

(56) References Cited

U.S. PATENT DOCUMENTS

| | | | |
|---|---|---|---|
| 5,434,994 A | 7/1995 | Shaheen et al. | |
| 6,324,654 B1 | 11/2001 | Wahl et al. | |
| 6,711,572 B2 | 3/2004 | Zakharov et al. | |
| 7,143,307 B1 | 11/2006 | Witte et al. | |
| 7,206,910 B2 | 4/2007 | Chang et al. | |
| 7,246,200 B1 | 7/2007 | van Rietschote et al. | |
| 7,600,021 B2 | 10/2009 | Schottland et al. | |
| 2006/0129654 A1* | 6/2006 | Sato | 709/213 |
| 2007/0180436 A1* | 8/2007 | Travostino et al. | 717/138 |
| 2007/0198602 A1 | 8/2007 | Ngo et al. | |
| 2008/0177947 A1* | 7/2008 | Eguchi et al. | 711/114 |
| 2009/0125904 A1* | 5/2009 | Nelson | 718/1 |
| 2009/0240975 A1* | 9/2009 | Shitomi et al. | 714/5 |
| 2009/0276771 A1 | 11/2009 | Nickolov et al. | |
| 2010/0161550 A1* | 6/2010 | Jiang et al. | 707/610 |

(Continued)

*Primary Examiner* — Philip Chea
*Assistant Examiner* — Mohammed Ahmed
(74) *Attorney, Agent, or Firm* — William H. Hartwell; Hunter E. Webb; Keohane & D'Alessandro PLLC

(57) ABSTRACT

Embodiments of the present invention provide an approach for migrating virtual machines across network (e.g., WAN) separated data centers (e.g., storage clouds). Specifically, under embodiments of the present invention, a first storage system associated with a first data center is synchronized with a second storage system associated with a second data center via a storage system link. Then, a minimal state of a virtual machine is migrated from a first computer in the first data center to a second computer in the second data center via a WAN link. Using the minimal state, the virtual machine is stored in the second computer. Thereafter, the storage system link is terminated. In addition, as updated pages are received in memory of the first computer, they are migrated to the second computer via the WAN link. Once this migration is complete, the WAN link can be terminated. Therefore, embodiments of the present invention provide at least two forms of synchronization: computational synchronization and storage synchronization.

22 Claims, 5 Drawing Sheets

(56) References Cited

U.S. PATENT DOCUMENTS

| | | | |
|---|---|---|---|
| 2011/0019676 A1* | 1/2011 | Portolani et al. | 370/395.53 |
| 2011/0099318 A1* | 4/2011 | Hudzia et al. | 711/6 |
| 2011/0208695 A1* | 8/2011 | Anand et al. | 707/610 |
| 2011/0238775 A1* | 9/2011 | Wu et al. | 709/213 |
| 2011/0264788 A1* | 10/2011 | Costa | 709/224 |

* cited by examiner

MIGRATING VIRTUAL MACHINES ACROSS NETWORK SEPARATED DATA CENTERS

TECHNICAL FIELD

The present invention generally relates to virtual machine migration. Specifically, the present invention relates to the migration of virtual machines across network (e.g., wide area network or WAN) separated data centers (e.g., storage clouds).

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, and storage devices.

With multiple clouds operating in different geographical regions, the ability to move workloads running inside of virtual machines from one location to another is a growing desire. Among other things, previous solutions do not address the following: (1) the cost of accessing storage over a WAN once the virtual machine has moved; and (2) the cost of moving large amounts of virtual machine state information over the WAN.

SUMMARY

Embodiments of the present invention provide an approach for migrating virtual machines across network separated data centers (e.g., storage clouds). Specifically, under embodiments of the present invention, a first storage system associated with a first data center is synchronized with a second storage system associated with a second data center via a storage system link. Then, a minimal state of a virtual machine is migrated from a first computer in the first data center to a second computer in the second data center via a WAN link. Using the minimal state, the virtual machine is started in the second computer. Thereafter, the storage system link is terminated. In addition, as updated/dirty pages are received in memory of the first computer, they are migrated to the second computer via the WAN link. Once this migration is complete, the WAN link can be terminated. Therefore, embodiments of the present invention provide at least two forms of synchronization: computational synchronization and storage synchronization.

A first aspect of the present invention provides a method for migrating a virtual machine across network separated data centers, comprising: synchronizing a first storage system associated with a first data center with a second storage system associated with a second data center via a storage system link; migrating a minimal state of the virtual machine from a first computer in the first data center to a second computer in the second data center via a WAN link; starting the virtual machine in the second computer based on the minimal state; and terminating the storage system link.

A second aspect of the present invention provides a system for migrating a virtual machine across network separated data centers, comprising: a bus; a processor coupled to the bus; and a memory medium coupled to the bus, the memory medium comprising instructions to: synchronize a first storage system associated with a first data center with a second storage system associated with a second data center via a storage system link; migrate a minimal state of the virtual machine from a first computer in the first data center to a second computer in the second data center via a WAN link; start the virtual machine in the second computer based on the minimal state; and terminate the storage system link.

A third aspect of the present invention provides a computer program product for migrating a virtual machine across network separated data centers, the computer program product comprising a computer readable storage media and program instructions stored on the computer readable storage media, to: synchronize a first storage system associated with a first data center with a second storage system associated with a second data center via a storage system link; migrate a minimal state of the virtual machine from a first computer in the first data center to a second computer in the second data center via a WAN link; start the virtual machine in the second computer based on the minimal state; and terminate the storage system link.

A fourth aspect of the present invention provides a method for deploying a system for migrating a virtual machine across network separated data centers, comprising: providing a computer infrastructure being operable to: synchronize a first storage system associated with a first data center with a second storage system associated with a second data center via a storage system link; migrate a minimal state of the virtual machine from a first computer in the first data center to a second computer in the second data center via a WAN link; start the virtual machine in the second computer based on the minimal state; and terminate the storage system link.

BRIEF DESCRIPTION OF THE DRAWINGS

These and other features of this invention will be more readily understood from the following detailed description of the various aspects of the invention taken in conjunction with the accompanying drawings in which.

Figure 1:
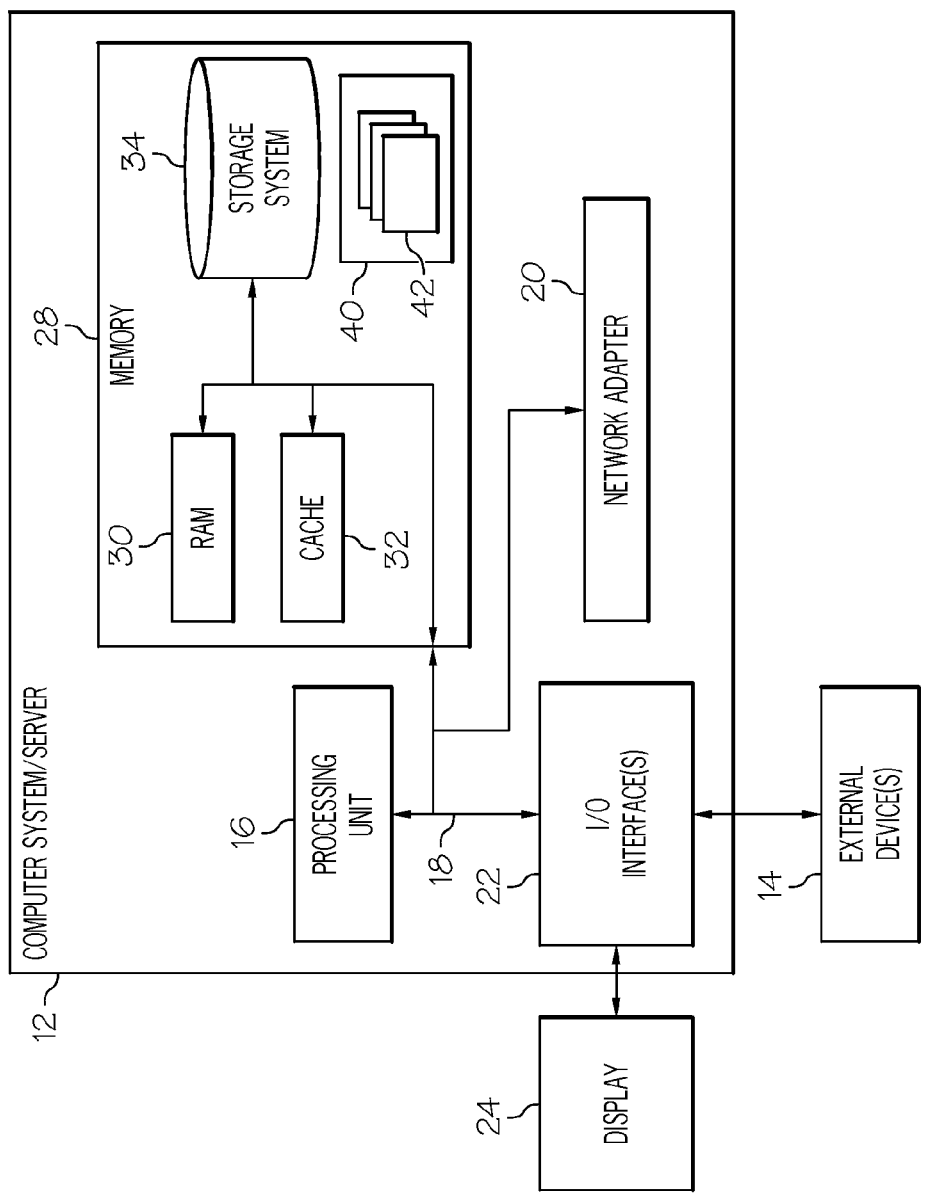
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the present invention provide an approach for migrating virtual machines across WAN separated data centers (e.g., storage clouds). Specifically, under embodiments of the present invention, a first storage system associated with a first data center is synchronized with a second storage system associated with a second data center via a storage system link. Then, a minimal state of a virtual machine is migrated from a first computer in the first data center to a second computer in the second data center via a WAN link. Using the minimal state, the virtual machine is stored in the second computer. Thereafter, the storage system link is terminated. In addition, as updated/dirty pages are received in memory of the first computer, they are migrated to the second computer via the WAN link. Once this migration is complete, the WAN link can be terminated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Therefore, embodiments of the present invention provide at least two forms of synchronization: computational synchronization and storage synchronization.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
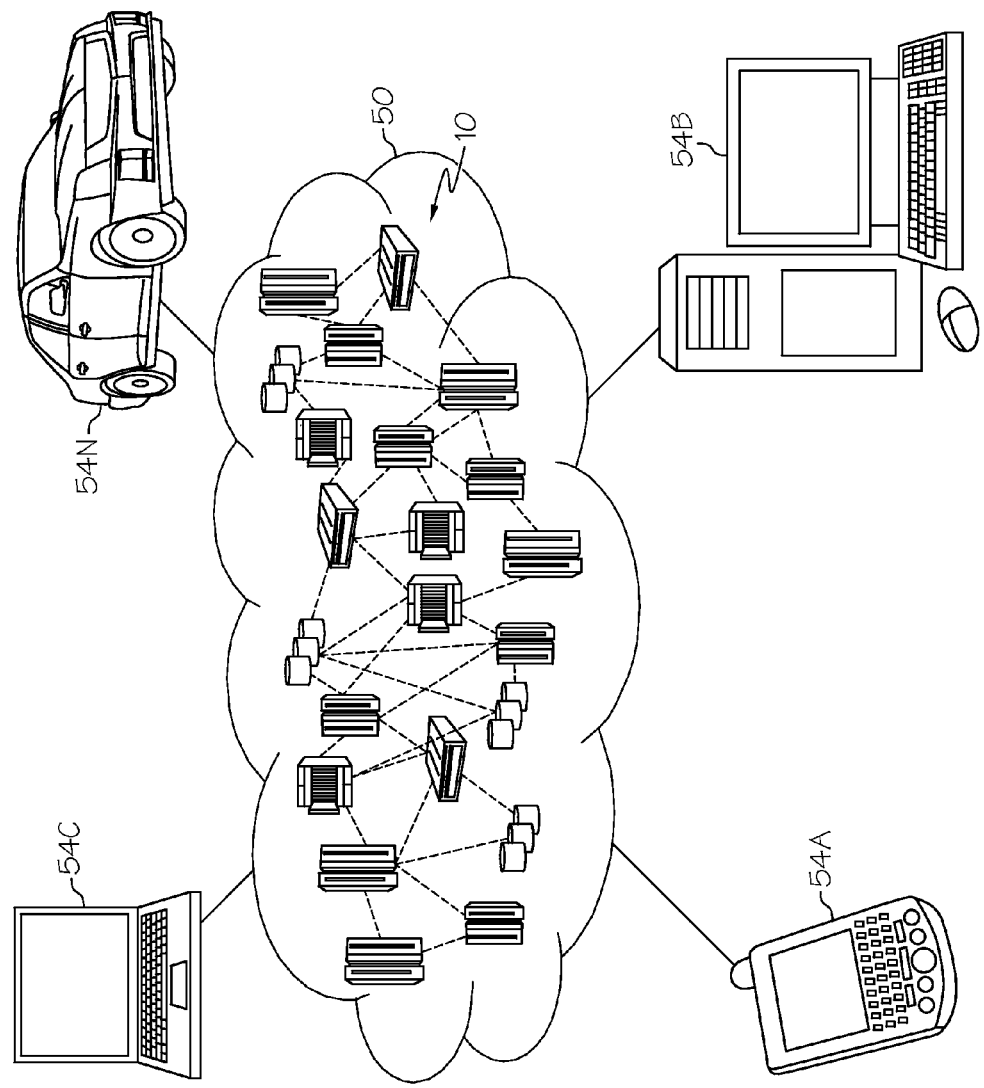
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
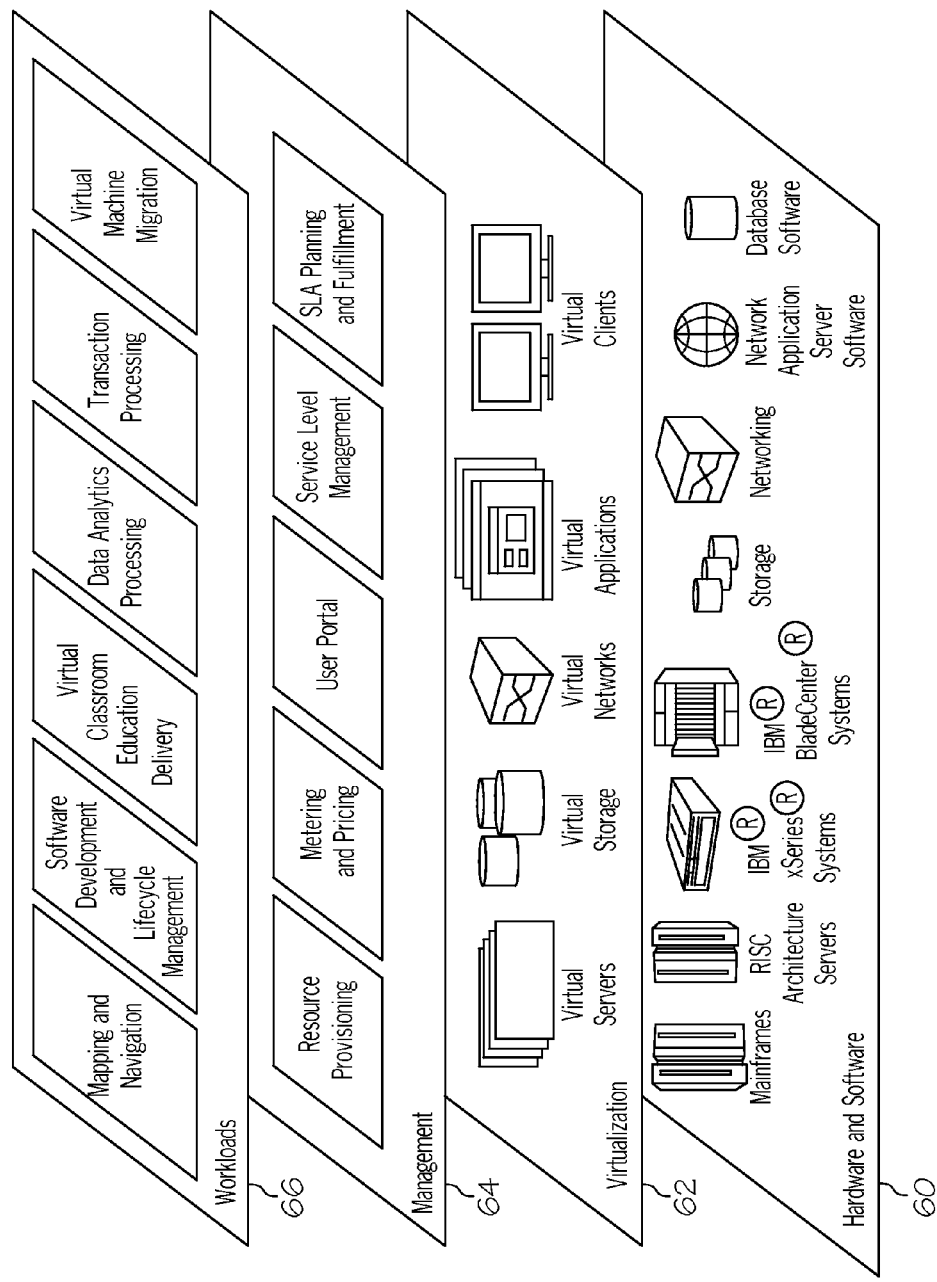
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual machine migration. As mentioned above, all of the foregoing examples described with respect to FIG. 3 are illustrative only, and the invention is not limited to these examples.

It is understood all functions of the present invention as described herein are typically performed by the virtual machine migration function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Figure 4:
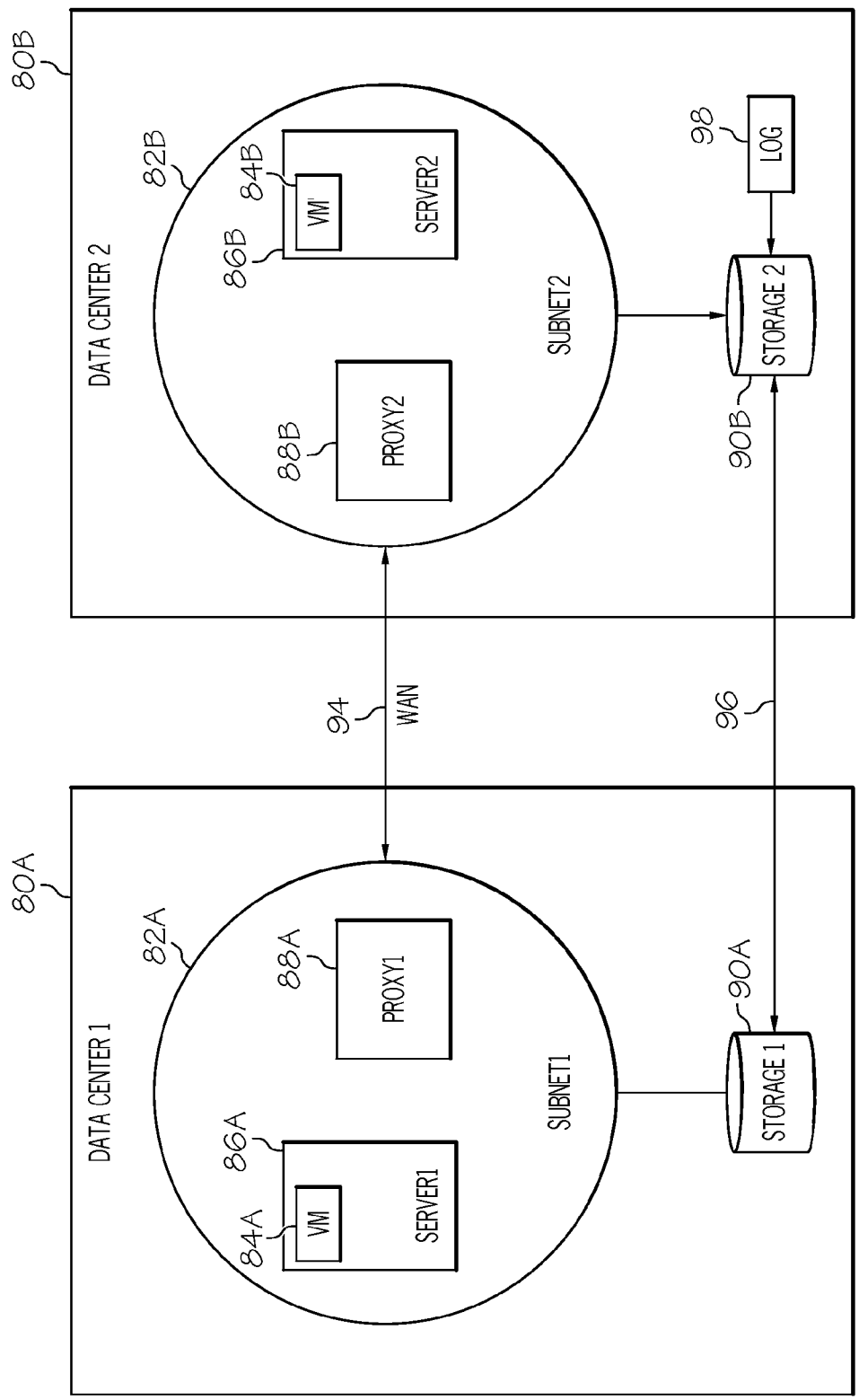
FIG. 4 depicts the migration of a virtual machine across WAN separated data centers according to an embodiment of the present invention.

Referring now to FIG. 4, the migration of a virtual machine across wide area network (WAN) separated data centers 80A-B is shown. Under an embodiment of the present invention, storage system 90A associated with data center 80A in subnet 82A is synchronized with storage system 90B in subnet 82B via a storage system link 96. During the synchronization step, the data synchronized may include virtual machine and/or memory management data. In case of VMware, the data synchronized will include files in VMDK format, in the case of Xen it would include virtual disk files (as known in the art, Xen is an open source virtual machine monitor for x86-compatible computers). In any event, all data synchronized would be communicated across storage system link 96, which could be any type of network connection (e.g., Ethernet, wireless, etc.). Once the synchronization is complete, a minimal state (e.g., central processing unit data, register data, etc.) of the virtual machine 84A is migrated from a first computer (server 86A) to a second computer (server 86B) via a WAN link 94. Along these lines, the minimal state can comprise any information needed to instantiate the virtual machine on a remote computer such as server 86B. As depicted, each data center 80A-B has a corresponding proxy 88A-B. Under this embodiment, proxy 88B acts as a proxy for data center 80B, while proxy 88B acts as a proxy for data center 80B. In any event, the virtual machine will be started in the second computer based on the minimal state. Thereafter, the storage system link 96 will be terminated.

Also under an embodiment of the present invention updated/dirty pages that are received for virtual machine 84A are migrated to virtual machine 84B. As known in the art, updated/dirty pages (e.g., pertaining to operating system updates) are stored in volatile memory of server 86A as opposed to a hard disk. The term "dirty page" is used in the art in the area of virtual memory management to refer to a page in memory that has been updated and is therefore "dirty" as opposed to a page that has not been updated and is deemed "clean". They will be migrated via proxies 88A-B to server 86B before being discarded. Once all updated/dirty pages have been migrated, WAN link 94 can be terminated. Still yet, it should be understood that data centers 80A-B can be associated with the same or entirely different storage clouds. For example, data centers 80A-B could be associated with storage cloud X. Alternatively, data center 80A could be associated with storage cloud X, while data center 80-B could be associated with storage cloud Y.

Also under an embodiment of the present invention a log/list 98 of all updated pages can be maintained by the second subnet 82B. Log 98 identifies which updated pages have been received by second subnet 82B and stored in the second storage 90B, and which updated pages have yet to be migrated from the first subnet 82A. This allows a determination to be made as to whether all updated pages have been migrated, after which log 98 is deleted.

Figure 5:
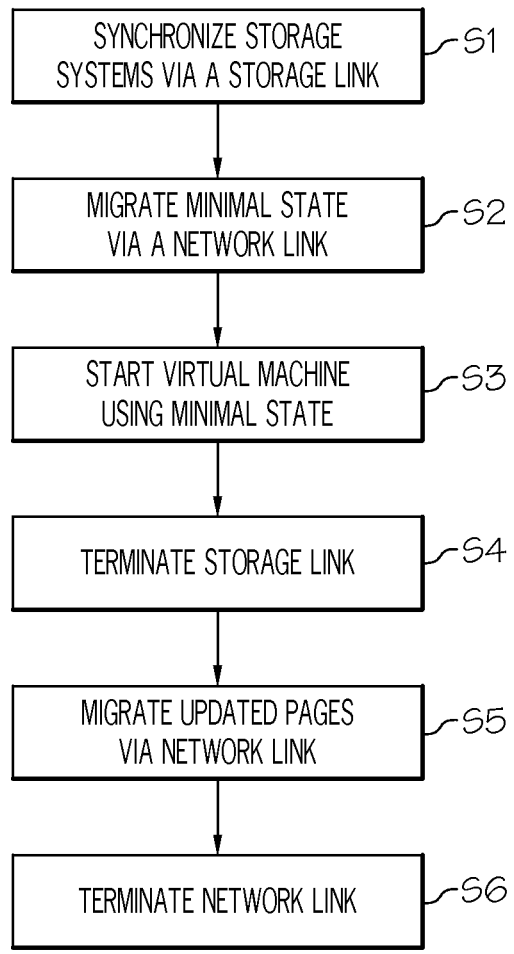
FIG. 5 depicts a method flow diagram according to an embodiment of the present invention.

Referring now to FIG. 5, a method flow diagram according to the present invention is shown. As depicted, in step S1, a first storage system associated with a first data center is synchronized with a second storage system associated with a second data center via a storage system link. In step S2, a minimal state of a virtual machine is migrated from a first computer in the first data center to a second computer in the second data center via a WAN link. In step S3, the virtual machine is started in the second computer based on the minimal state. In step S4, the storage system link is terminated. In step S5, updated/dirty pages are migrated via the WAN link, and the WAN link is terminated in step S6.

While shown and described herein as a virtual machine migration solution, it is understood that the invention further provides various alternative embodiments. For example, in one embodiment, the invention provides a computer-readable/useable medium that includes computer program code to enable a computer infrastructure to provide virtual machine migration functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide virtual machine migration functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for virtual machine migration. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for migrating a virtual machine across network separated data centers, comprising:
   synchronizing a first storage system associated with a first subnet with a second storage system associated with a second subnet via a storage system link;
   migrating a minimal state of the virtual machine executing on a first computer in the first subnet from the first computer to a second computer in the second subnet via a network link, the minimal state being an image of the virtual machine stored on the first storage system that contains only a minimum state information necessary for execution of the virtual machine;
   starting an execution of the virtual machine in the second computer based solely on the minimal state;
   terminating the storage system link; and
   migrating, subsequent to the terminating of the storage system link, updated pages of the virtual machine received from short term memory of the first computer subsequent to the migrating of the minimal state of the virtual machine to a memory of the second computer via the network link, the updated pages containing current state information of the virtual machine which, when merged with the minimal state, cause the virtual machine executing on the second computer to assume a latest state of execution of the virtual machine of the first computer.

2. The method of claim 1, further comprising receiving the updated pages in memory of the first computer, the updated pages comprising operating system data.

3. The method of claim 2, further comprising terminating the network link subsequent to the migrating of the updated pages.

4. The method of claim 1, the minimum state and the updated pages being migrated via a set of proxies in the first subnet and the second subnet.

5. The method of claim 1, further comprising maintaining a log on the second storage system, the log identifying which of the updated pages have been received in the memory of the second computer, and which of the updated pages have yet to be migrated to the memory of the second computer.

6. The method of claim 1, the first subnet being associated with a first storage cloud and the second subnet being associated with a second storage cloud.

7. The method of claim 1, the minimal state comprising central processing unit data and register data.

8. A system for migrating a virtual machine across network separated data centers, comprising:
   a bus;
   a processor coupled to the bus; and
   a memory medium coupled to the bus, the memory medium comprising instructions to:
      synchronize a first storage system associated with a first subnet with a second storage system associated with a second subnet via a storage system link;

migrate a minimal state of the virtual machine executing on a first computer in the first subnet from the first computer to a second computer in the second subnet via a network link, the minimal state being an image of the virtual machine stored on the first storage system that is contains only a minimum state information necessary for execution of the virtual machine;

start an execution of the virtual machine in the second computer based solely on the minimal state;

terminate the storage system link; and migrate, subsequent to the terminating of the storage system link, updated pages of the virtual machine received from short term memory of the first computer subsequent to the migrating of the minimal state of the virtual machine to a memory of the second computer via the network link, the updated pages containing current state information of the virtual machine which, when merged with the minimal state, cause the virtual machine executing on the second computer to assume a latest state of execution of the virtual machine of the first computer.

9. The system of claim 8, the memory medium further comprising instructions to receive the updated pages in memory of the first computer, the updated pages comprising operating system data.

10. The system of claim 9, the memory medium further comprising instructions to terminate the network link subsequent to the migrating of the updated pages.

11. The system of claim 9, the minimum state and the updated pages being migrated via a set of proxies in the first subnet and the second subnet.

12. The system of claim 9, the memory medium further comprising instructions to maintain a log on the second storage system, the log identifying which of the updated pages have been received in the memory of the second computer, and which of the updated pages have yet to be migrated to the memory of the second computer.

13. The system of claim 8, the first data center being associated with a first storage cloud and the second data center being associated with a second storage cloud.

14. The system of claim 8, the minimal state comprising central processing unit data and register data.

15. A computer program product for migrating a virtual machine across network separated data centers, the computer program product comprising a computer readable storage device, and program instructions stored on the computer readable storage device, which when executed causes a computer to:

synchronize a first storage system associated with a first subnet with a second storage system associated with a second subnet via a storage system link;

migrate a minimal state of the virtual machine executing on a first computer in the first subnet from the first computer to a second computer in the second subnet via a network link, the minimal state being an image of the virtual machine stored on the first storage system that is contains only a minimum state information necessary for execution of the virtual machine;

start an execution of the virtual machine in the second computer based solely on the minimal state;

terminate the storage system link; and migrate, subsequent to the terminating of the storage system link, updated pages of the virtual machine received from short term memory of the first computer subsequent to the migrating of the minimal state of the virtual machine to a memory of the second computer via the network link, the updated pages containing current state information of the virtual machine which, when merged with the minimal state, cause the virtual machine executing on the second computer to assume a latest state of execution of the virtual machine of the first computer.

16. The computer program product of claim 15, further comprising program instructions stored on the computer readable storage device which when executed causes a computer to receive the updated pages in memory of the first computer, the updated pages comprising operating computer program product data.

17. The computer program product of claim 16, further comprising program instructions stored on the computer readable storage device which when executed causes a computer to terminate the network link.

18. The computer program product of claim 15, the minimum state and the updated pages being migrated via a set of proxies in the first subnet and the second subnet.

19. The computer program product of claim 15, further comprising program instructions stored on the computer readable storage device which when executed causes a computer to maintain a log on the second subnet, the log identifying which of the updated pages have been received in the memory of the second computer, and which of the updated pages have yet to be migrated to the memory of the second computer.

20. The computer program product of claim 15, the first subnet being associated with a first storage cloud and the second subnet being associated with a second storage cloud.

21. The computer program product of claim 15, the minimal state comprising central processing unit data and register data.

22. A method for deploying a system for migrating a virtual machine across network separated data centers, comprising:

providing a computer infrastructure being operable to:

synchronize a first storage system associated with a first subnet with a second storage system associated with a second subnet via a storage system link;

migrate a minimal state of the virtual machine executing on a first computer in the first subnet from the first computer to a second computer in the second subnet via a network link, the minimal state being an image of the virtual machine stored on the first storage system that contains only a minimum state information necessary for execution of the virtual machine;

start an execution of the virtual machine in the second computer based solely on the minimal state;

terminate the storage system link; and migrate, subsequent to the terminating of the storage system link, updated pages of the virtual machine received from short term memory of the first computer subsequent to the migrating of the minimal state of the virtual machine to a memory of the second computer via the network link, the updated pages containing current state information of the virtual machine which, when merged with the minimal state, cause the virtual machine executing on the second computer to assume a latest state of execution of the virtual machine of the first computer.

* * * * *